Dec. 22, 1970  W. A. REILLY  3,548,599
FLOATING OIL BARRIER
Filed July 9, 1969  2 Sheets-Sheet 2

United States Patent Office 3,548,599
Patented Dec. 22, 1970

3,548,599
FLOATING OIL BARRIER
William A. Reilly, Dover, Mass., assignor to Sawyer-Tower Products, Inc., Watertown, Mass., a corporation of Massachusetts
Filed July 9, 1969, Ser. No. 840,353
Int. Cl. E02b 3/00, 15/04
U.S. Cl. 61—1                                14 Claims

ABSTRACT OF THE DISCLOSURE

A barrier for intercepting surface spread of oil in a body of water includes a semi-flexible buoyant section and a semi-flexible submerged stabilizing section which hold the upper surface of an elongated trough-shaped deck above the normal water level, from which liquid sloshing over one side of the barrier into the trough can be drained out of one or both ends of the trough. A series of the barriers float in enclosing array around a source of oil leakage.

---

This invention relates to a floating barrier operative to intercept surface spread of unwanted oil or other liquid contaminants in bodies of water.

The invention has as an object a more reliable and efficient means for averting wild life and beach contaminating catastrophes which have been occurring from uncontrolled escape of oil from ruptured sea-going tankers and from off-shore oil wells.

Devices of this invention are more effective in rough water than those heretofore proposed due to a combination of features, and incorporate a draw-off line which continuously, by a pumping operation, drains a catch trough positioned to collect any intermittently over-the-top sloshing resulting from wave motion of the body of oil covered water.

Means are also incorporated to resist snaking of the barrier which otherwise has a good deal of flexibility due to its construction from flexible and semi-flexible materials. The barrier is sufficiently light in weight that it is portable in fairly long lengths which can be connected together end to end before or after positioning the barrier, as by extension between rafts and/or by anchoring in an enclosing array about the source of oil leakage.

Figure 1:
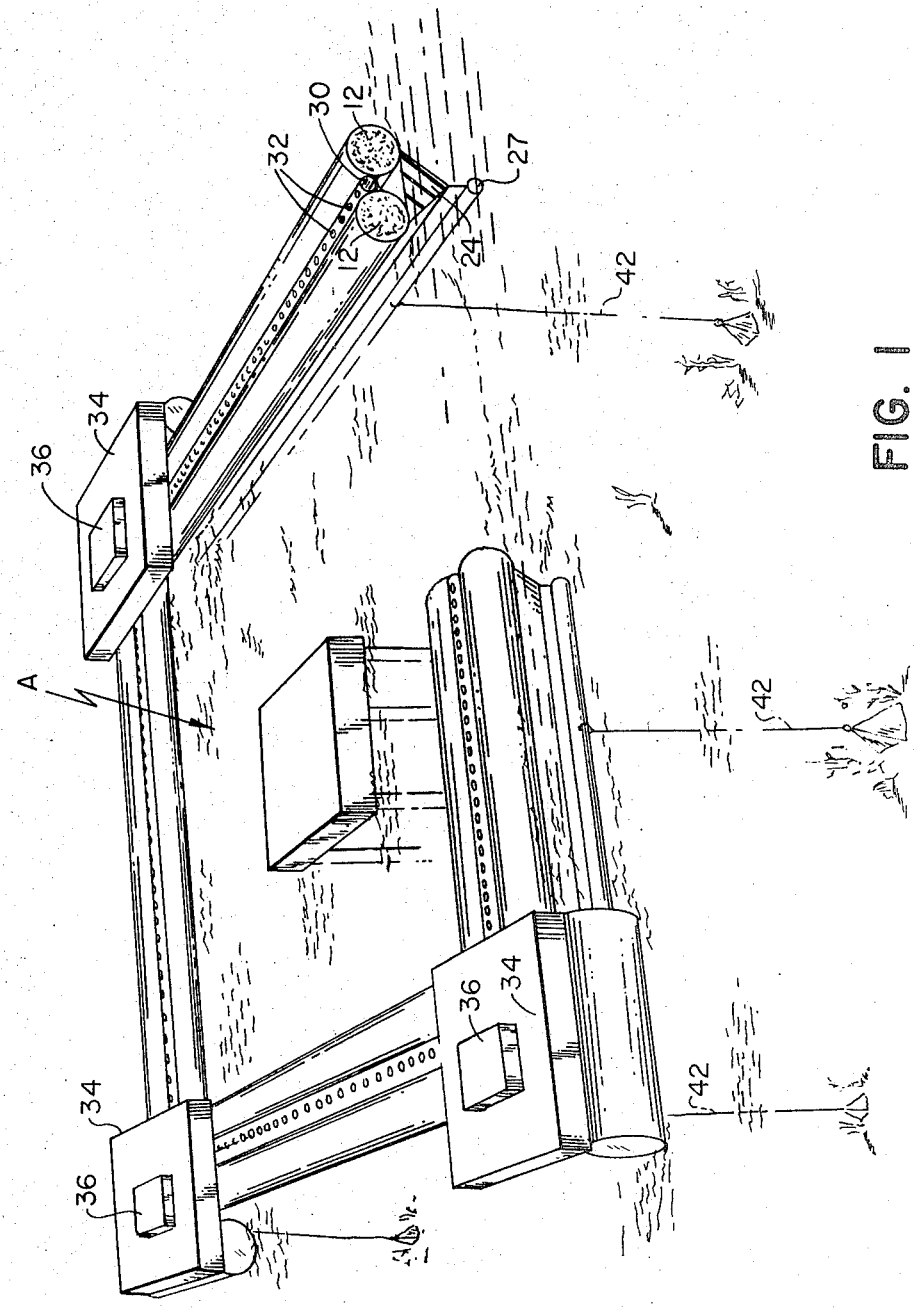

In the accompanying drawings there is shown in FIG. 1, very diagrammatically, an off-shore drilling rig platform A encircled with the device of this invention in greatly exaggerated proportion for the purposes of clarity and partly broken away.

Figure 2:
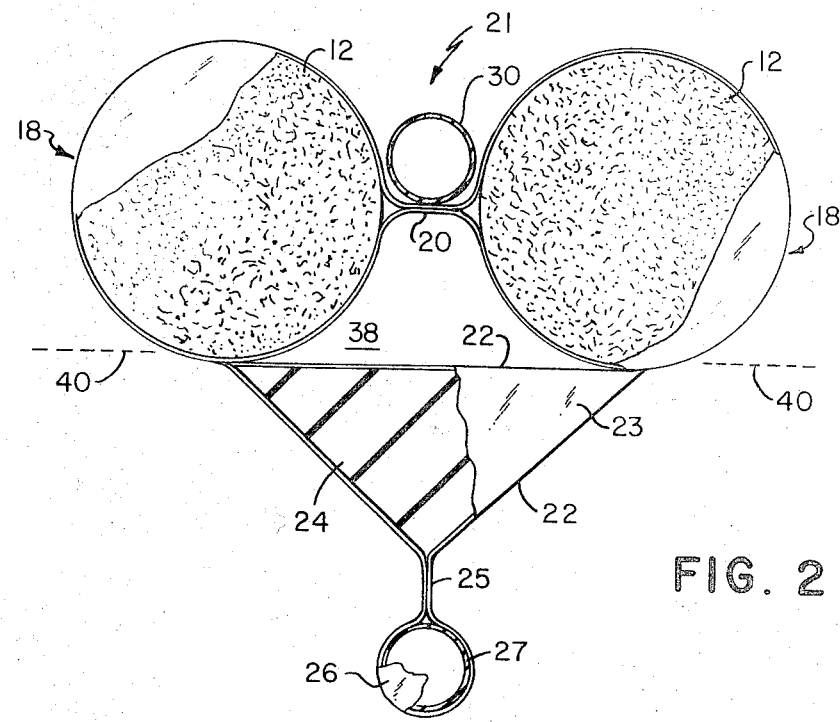
Figure 3:
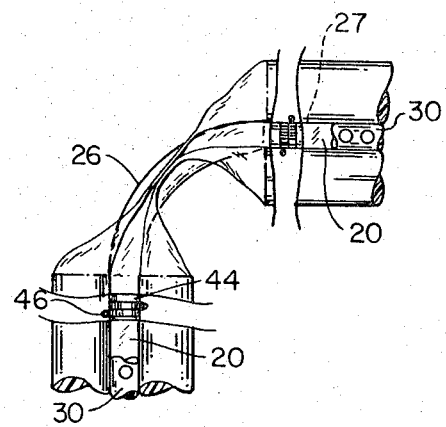

FIG. 2 is a cross-sectional view of a barrier in accordance with this invention, with certain of the elements broken away to indicate the pocket nature of the fabric portion of the assembly, and FIG. 3 is a detail view of a corner structure.

The barrier is heavy duty (6 ounce, 2 x 2) nylon fabric impregnated or coated with an oil- and salt water-resistant neoprene or vinyl polymer, giving a fabric weight of about 28 ounces per square yard. This is fabricated with heat seals or stitching or both to form five connected pockets. Two circular pockets at the top are filled with long cylindrical bodies 12 of buoyant material, preferably polyurethane foam. They are joined with an intervening multiple layer web 20 forming with the adjacent portions of the bodies 12, a trough shaped semi-flexible deck 21. Suspended below the two elements 18, 18 is a triangular shaped body of fabric 22 sealed to the bottoms of the cylindrical elements 18 forming a third pocket 23 packed with wedge-shaped, solid, dimensionally stable, heavy waste reclaimed rubber blocks 24, in sections of convenient handling length, acting as a weighting and spacing material. Suspended centrally of the barrier at the bottom below a multiple layer vertical web 25 of the fabric covering is a fourth fabric pocket 26 containing a three inch neoprene oil hose 27. The hose is fairly stiff but has a certain amount of flexibility.

Laid in between the cylindrical elements on the web 20 is another neoprene oil hose 30 which has a row of perforations as shown at 32 in FIG. 1, so that the ends thereof can be coupled at corner rafts 34 to pumping mechanism 36 for pumping surface water which sloshes over one or both of the cylindrical elements 18 out of and draining the trough formed therebetween by the web 20. The perforations may face downwardly or in other directions or may be placed in spiral or other configuration around the hose 30.

In operation the lower hose 27 is open-ended and fills with water when the barrier is floating and acts as a rudder to resist snaking of the barrier and helps to hold it in a straight line, to prevent the oil from going underneath the barrier.

On the contrary the space 38 between the reclaimed rubber pocket 23 and the web 20 is air-sealed at the ends so as to form a fifth sealed but empty pocket giving additional buoyancy to that provided by the polyurethane or other buoyant material 12. This water-tight chamber can accommodate electrical wiring to energize navigation beacons placed along the barrier.

Usually the ends of the cylindrical pockets and of the triangular pocket are also covered with coated fabric to make these pockets air and liquid tight. The normal waterline is indicated at 40 in FIG. 2.

While normally the lengths of the barrier will be separate for each side of the enclosure, they may be, if desired, connected at the raft corners by continuous fabric lengths, but omitting the buoyant material 12, the blocks 24 and the upper hose 30. The hoses 27 extending along each barrier side may then be connected, as shown in FIG. 3 with elbows 44 made of the same hose material and connecting the open ends of the adjacent hose sections 27 by means of conventional hose couplers 46. Since the upper hoses 30 and the blocks and buoyant material do not turn the corners, the plies of the fabric can be flattened at the corners as shown in FIG. 3 to make the curved connection.

In operation then, when strung as an enclosure about a source of oil leakage, the barrier maintains a level and a straightness due to the resistance to bending both in the vertical and horizontal directions. As a result the material does not bounce out of the water and waves seldom lift it sufficiently to allow passage of oil underneath the subterranean portion of the device. Sloshing over the top is cared for by the pumping operation through the pipe 30.

It has been found that the barrier can best be made in 100 foot lengths with one foot diameter elements 18, but these of course can be connected together to form further lengths between pumping rafts. Moreover, it is contemplated that in extreme cases two of them can be positioned in side-by-side parallel relation to give double protection. The buoyant material may be in continuous lengths or sectional.

As can be seen, the barrier may be transported in knocked-down condition and be finally assembled at or near the water site, and anchored as required and as indicated by the anchors 42 in FIG. 1, connected to the rafts or to the barrier or both.

What is claimed is:

1. A barrier for confining surface spread of unwanted oil or other debris floating on liquid bodies comprising:
   a buoyant elongated upper section having a trough shaped water-tight semi-flexible deck,
   a lower section connected to said upper section and adapted to be submerged in a body of water for stabilizing said buoyant section while maintaining the upper surface of said deck above the normal water line, and means on said deck adapted to be connected to a pump for draining liquid accumulating in the trough of said deck out of one end of said deck.

2. A barrier as claimed in claim 1, wherein the draining means is an apertured hose.

3. A barrier as claimed in claim 1, wherein the lower section includes a hose adapted to be flooded by a liquid medium in which said barrier floats.

4. A series of barriers as claimed in claim 1 floating in a body of water and substantially enclosing a source of oil leakage.

5. A series of substantially straight barriers as claimed in claim 3 floating in rectilinear array on all sides of a source of oil leakage in a body of water, and hose elbows connecting the ends of the hoses in the lower sections of adjacent ends of said barriers at the corners of said array.

6. A barrier for confining surface spread of unwanted oil or other debris floating on liquid bodies comprising:
a pair of semi-flexible, elongated, buoyant elements connected together by an intervening web forming a longitudinal catch trough between and above the bottoms of said elements, weight means suspended from said elements for stabilizing said elements, including a relatively stiff, but semi-flexible hose adapted to be flooded by a liquid medium in which said barrier floats, with the upper surface of said web being maintained above the normal liquid line of said medium, and a continuous apertured pipe laid on and extending along said trough, through which liquid sloshing over said elements into and accumulating in said trough can be pumped longitudinally of said barrier for recovery upon discharge at the end of said pipe.

7. A barrier as claimed in claim 6, wherein the web is formed of flexible coated fabric.

8. A barrier as claimed in claim 6, wherein the hose suspended from said elements is contained within a pocket formed by flexible fabric connected to said elements.

9. A barrier as claimed in claim 6, wherein the weight means includes sectional wedge-shaped blocks contained within a triangular shaped fabric pocket connected to said elements.

10. A barrier as claimed in claim 6 wherein the weight means is suspended centrally between and below said elements.

11. A multi-pocket device adapted to form, when assembled with buoyant and weighting elements, a floating barrier for confining surface spread of unwanted oil floating in bodies of water, comprising, flexible sheet material forming two parallel spaced, horizontally extending, upper hollow pockets for receiving buoyant material, a flexible web connecting said sheet material together and adapted to support a drain hose thereon, flexible sheet material connected to said pocket forming sheet material, forming a third pocket below said two parallel pockets for receiving weighting material, and sheet material below said third pocket forming a fourth pocket adapted to receive a further stabilizing element.

12. A multi-pocket device as claimed in claim 11 wherein said first and second parallel pockets and said fourth pocket are cylindrical in cross section.

13. A multi-pocket device as claimed in claim 11 wherein said third pocket is triangular in cross section with its base on top.

14. A multi-pocket device as claimed in claim 11 having a fifth pocket between said web and the upper wall of said third pocket, said fifth pocket being air tight.

References Cited
UNITED STATES PATENTS

| | | | |
|---|---|---|---|
| 2,240,567 | 5/1941 | Meacham | 61—1F |
| 2,682,151 | 6/1954 | Simpson et al. | 61—1F |
| 3,476,246 | 11/1969 | Dahan | 61—1F |
| 3,503,214 | 3/1970 | Desty et al. | 61—1F |

PETER M. CAUN, Primary Examiner